US010489616B2

(12) United States Patent
Watanabe et al.

(10) Patent No.: US 10,489,616 B2
(45) Date of Patent: Nov. 26, 2019

(54) CARD READER AND MAGNETIC SENSOR UNIT

(71) Applicant: NIDEC SANKYO CORPORATION, Suwa-gun, Nagano (JP)

(72) Inventors: Takeki Watanabe, Suwa-gun Nagano (JP); Fumiya Akasu, Suwa-gun Nagano (JP)

(73) Assignee: NIDEC SANKYO CORPORATION, Suwa-gun Nangano (JP)

( * ) Notice: Subject to any disclaimer, the term of this patent is extended or adjusted under 35 U.S.C. 154(b) by 0 days.

(21) Appl. No.: 16/145,742

(22) Filed: Sep. 28, 2018

(65) Prior Publication Data
US 2019/0102580 A1   Apr. 4, 2019

(30) Foreign Application Priority Data

Sep. 29, 2017   (JP) .................................. 2017-189316

(51) Int. Cl.
*G06K 7/08*    (2006.01)
*G06K 7/00*    (2006.01)

(52) U.S. Cl.
CPC .......... *G06K 7/0021* (2013.01); *G06K 7/0004* (2013.01); *G06K 7/087* (2013.01)

(58) Field of Classification Search
USPC ......................................................... 235/451
See application file for complete search history.

(56) References Cited

U.S. PATENT DOCUMENTS

2004/0164150 A1* 8/2004 Mori .................... G06K 7/0021
                                                               235/440

FOREIGN PATENT DOCUMENTS

JP    2005156225 A    6/2005

* cited by examiner

*Primary Examiner* — Jamara A Franklin
(74) *Attorney, Agent, or Firm* — Cantor Colburn LLP

(57) ABSTRACT

A card reader may include a card reader main body having a card transport path and a card insertion port; and a magnetic sensor unit configured to detect the contact terminal of the IC chip of the card. The card reader main body may include a mount unit in which the magnetic sensor unit is detachably mounted. The mount unit may include a locked unit. The magnetic sensor unit may include a magnetic sensor having a sensor surface facing a side of the card transport path and an opposite surface facing an opposite direction of the sensor surface, a sensor holder having a locking unit locked into the locked unit and a fixation unit to which the magnetic sensor is fixed, and an adhesive configured to fix the magnetic sensor to the fixation unit. The adhesive covers the opposite surface.

20 Claims, 7 Drawing Sheets

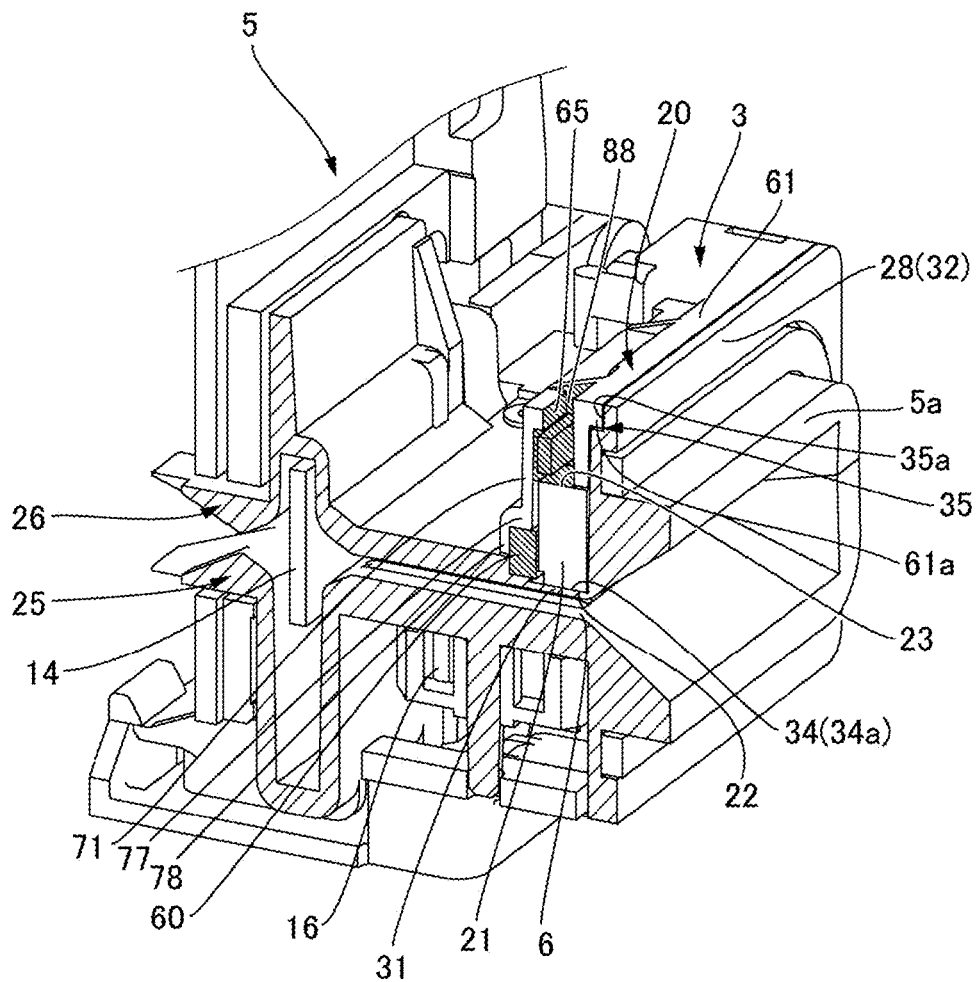
FIG. 3
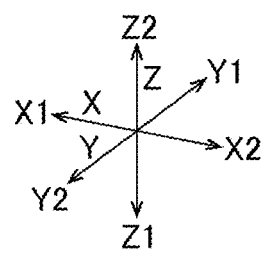

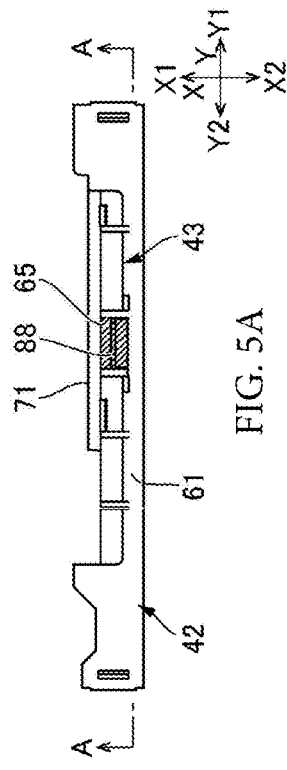
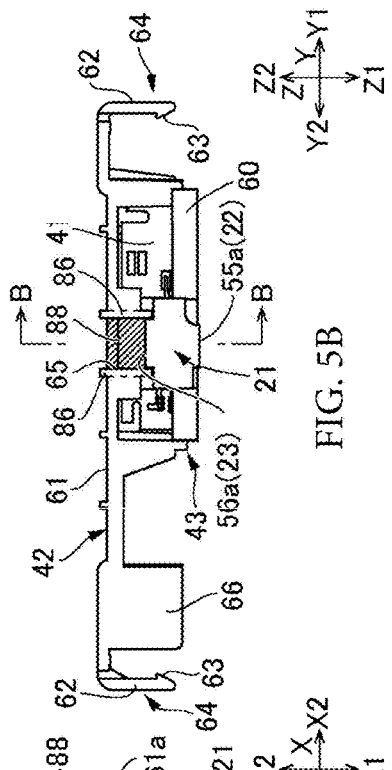
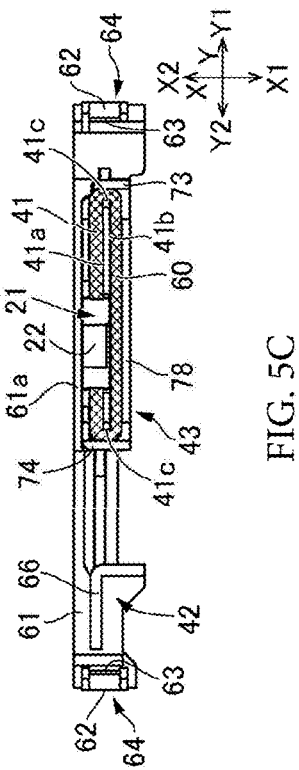

CARD READER AND MAGNETIC SENSOR UNIT

CROSS REFERENCE TO RELATED APPLICATION

The present application claims priority under 35 U.S.C. § 119 to Japanese Application No. 2017-189316 filed Sep. 29, 2017, the entire content of which is incorporated herein by reference.

TECHNICAL FIELD

At least an embodiment of the present invention relates to a card reader including a magnetic sensor unit configured to detect a contact terminal of an IC chip mounted on a card, and to a magnetic sensor unit.

BACKGROUND

A magnetic card in which a magnetic stripe is arranged and an IC card on which an IC chip is mounted are known as cards from which information is read and into which information is written by a card reader. A card reader described in Patent Document 1 includes a magnetic head configured to read or write information from or into a magnetic stripe and an IC contact block configured to contact a contact terminal of an IC chip to perform communication with the IC chip. Further, the card reader includes a card transport path extending through a read/write position of the magnetic head and a contact position of the IC contact block, a card insertion port for inserting the card into the card transport path, and a card transport mechanism configured to transport the card inserted into the card transport path along the card transport path. Further, the card reader of Patent Document 1 includes a pre-head configured to detect a presence or absence of the magnetic stripe, when the card is inserted from the card insertion port into the card transport path, and a magnetic sensor configured to detect a presence or absence of the contact terminal of the IC chip. If the magnetic stripe is detected by the pre-head, the card reader drives the card transport mechanism to transport the card, and drives the magnetic head to perform read or write from or into the magnetic stripe of the card passing through the read/write position. Further, if the contact terminal of the IC chip is detected by the magnetic sensor, the card reader drives the card transport mechanism to transport the card to a contact position, and drives the IC contact block to perform communication with the IC chip.

The magnetic sensor configured to detect the contact terminal of the IC chip includes a core body, a first excitation coil, a second excitation coil, a detection coil, and a housing made of resin, the housing covering the core body, the first exciting coil, the second excitation coil, and the detection coil. The core body includes a core center unit around which the detection coil is wound, a first core end unit around which the first excitation coil is wound, the first core end unit protruding toward a side of a card transport path from the core center unit, a second core end unit around which the second excitation coil is wound, the second core end unit protruding toward a direction opposite to the card transport path from the core center unit, a first end surface at an opposite side of the core center unit at the first core end unit, and a second end surface at an opposite side of the core center unit at the second core end unit. A surface overlapping the first end surface in the housing is a sensor surface of the magnetic sensor, and opposes the card inserted into the card transport path from the card insertion port with a narrow gap. A surface overlapping the second end surface in the housing is an opposite surface facing an opposite direction of the sensor surface. When the first excitation coil and the second exciting coil are excited, a first magnetic field is generated in the direction from the sensor surface to the core center unit and a second magnetic field is generated in the direction from the opposite surface to the core center unit.

When the contact terminal of the IC chip is not present at the detection position opposite of the sensor surface, the first magnetic field and the second magnetic field are equal, and thus, the detection coil outputs no output (the output is zero). On the other hand, when the contact terminal is present at the detection position, a change due to the contact terminal of the IC chip is generated in the first magnetic field of the first excitation coil of the side of the card, and thus, an output corresponding to the change of the first magnetic field can be obtained from the detection coil. Therefore, based on the output from the detection coil, the contact terminal of the IC chip can be detected.

Patent Document

Patent Document 1: Japanese Unexamined Patent Application Publication No. 2005-156225

If the card reader is used in an application for performing only reading/writing of a magnetic card, a magnetic sensor configured to detect the contact terminal of the IC chip is not needed. Therefore, if the magnetic sensor can be omitted in a case where the application of the card reader is limited or the like, it is possible to suppress an introduction cost to a shop and the like.

On the other hand, if the card reader in which the magnetic sensor is omitted can be upgraded to an IC card-compatible card reader capable of handling an IC card, there is no need of newly purchasing the IC card-compatible card reader when there is a need of processing the IC card, and thus, it is possible to suppress an introduction cost of the IC card-compatible card reader.

SUMMARY

In view of the above problems, at least an embodiment of the present invention provides a card reader capable of an upgrade to a state where an IC card can be handled where necessary.

In order to solve the above problem, the card reader of at least an embodiment of the present invention includes a card reader main body including a card transport path through which the card is transported and a card insertion port configured to insert the card into the card transport path and a magnetic sensor unit configured to detect a contact terminal of an IC chip of the card inserted into the card transport path. The card reader main body includes a mount unit in which the magnetic sensor unit is detachably mounted. The mount unit includes a locked unit. The magnetic sensor unit includes a magnetic sensor including a sensor surface facing a side of the card transport path and an opposite surface facing an opposite direction of the sensor surface, a sensor holder including a locking unit locked into the locked unit and a fixation unit to which the magnetic sensor is fixed, and an adhesive configured to fix the magnetic sensor to the fixation unit. The adhesive covers the opposite surface.

According to at least an embodiment of the present invention, the magnetic sensor unit configured to detect the contact terminal of the IC chip mounted on the IC card is detachably mounted on the mount unit of the card reader main body. Therefore, if the application of the card reader is limited to an application where only the reading/writing of the magnetic card is performed, the magnetic sensor unit can be removed from the card reader main body and the magnetic sensor not needed for the application can be omitted. As a result, it is possible to suppress the introduction cost when the card reader is introduced to a shop or the like.

On the other hand, if processing of the IC card is needed, the card reader can be upgraded to an IC card-compatible card reader by mounting the magnetic sensor unit on the card reader in which the magnetic sensor is omitted. This eliminates a need of newly purchasing the IC card-compatible card reader, and thus, it is possible to suppress the introduction cost of the IC card-compatible card reader.

Here, the magnetic sensor unit is mounted on the card reader main body in a state where the locking unit of the magnetic sensor unit is locked into the locked unit arranged in the mount unit. Therefore, the magnetic sensor unit is surely fixed to the mount unit. Further, if the magnetic sensor unit is mounted on the mount unit in a state where the locking unit is locked into the locked unit, it is easy to define a position and a posture of the magnetic sensor unit on the card transport path. Further, the magnetic sensor is fixed to a sensor holder by an adhesive in the magnetic sensor unit. Therefore, it is easy to fix the magnetic sensor to the sensor holder. Further, the adhesive is applied to an opposite surface opposite to the sensor surface, and thus, it is possible to prevent or suppress a situation where the adhesive for fixing the magnetic sensor adheres to the sensor surface.

In at least an embodiment of the present invention, the magnetic sensor includes a core body, a first excitation coil, a second excitation coil, a detection coil, and a housing made of resin, the housing covering the core body, the first exciting coil, the second excitation coil and the detection coil. The core body includes a core center unit around which the detection coil is wound, a first core end unit around which the first excitation coil is wound, the first core end unit protruding toward a side of a card transport path from the core center unit, a second core end unit around which the second excitation coil is wound, the second core end unit protruding toward a direction opposite to the card transport path from the core center unit, a first end surface opposite to the core center unit at the first core end unit, and a second end surface opposite to the core center unit at the second core end unit. The first excitation coil and the second excitation coil are wound to generate magnetic fields in mutually opposite directions. The sensor surface is a surface overlapping the first end surface in the housing. The opposite surface can be a surface overlapping the second end surface in the housing. In this way, when the contact terminal of the IC chip is not present at the detection position opposite to the sensor surface, the magnetic fields of the two excitation coils are equal, and thus, the detection coil outputs no output (the output is zero). On the other hand, when the contact terminal is present at the detection position, a change resulting from the contact terminal of the IC chip is generated in the magnetic field of the first excitation coil at a side of the card, and thus, an output corresponding to the magnetic field change of the first excitation coil is obtained from the detection coil. Therefore, the contact terminal of the IC chip can be detected, based on the output from the detection coil. Here, in the magnetic sensor having such a configuration, due to the magnetic field generated by the second excitation coil, an iron sand or the like in the air may be attracted and adhere to the opposite surface. If the iron sand or the like in the air adheres to the opposite surface, the output from the detection coil varies, and thus, a problem arises that the contact terminal of the IC chip is falsely detected. To solve such a problem, the opposite surface is covered with an adhesive for fixing the magnetic sensor to a fixation unit. Therefore, the iron sand or the like does not adhere to the opposite surface of the magnetic sensor, and thus, it is possible to prevent a false detection.

In at least an embodiment of the present invention, it is possible that the magnetic sensor unit includes a circuit board on which the magnetic sensor is mounted, and the circuit board is fixed to the fixation unit by the adhesive. Thus, it is easy to fix the magnetic sensor and the circuit board to the fixation unit.

In at least an embodiment of the present invention, the mount unit includes a bottom plate unit located between the magnetic sensor unit and the card transport path, the sensor unit includes a sealant attached to the circuit board, the circuit board includes a circuit board top surface facing a side at which the card insertion port is located, and a circuit board bottom surface facing an opposite side of the card insertion port, the magnetic sensor is mounted on the circuit board top surface, and the sensor surface abuts against the bottom plate unit, the fixation unit includes a plate unit opposing the circuit board bottom surface, and the sealant is positioned between the plate unit and the bottom plate unit, and together with the plate unit, covers a whole of the circuit board bottom surface from an opposite side of the card insertion port, and is elastically deformed between the plate unit and the bottom plate unit to seal a gap between the plate unit and the bottom plate unit. In this way, when the magnetic sensor unit is mounted in the card reader main body, it is possible to prevent or suppress a situation where an iron powder or the like in the air moves to a side of the circuit board top surface from a side of the plate unit of the sensor holder and adheres to the magnetic sensor.

In at least an embodiment of the present invention, the plate unit includes a through hole for wiring, and in the circuit board, at an end edge at a side of the card transport path of a pair of circuit board side surfaces located at both sides of a width direction of the card transport path and an end edge at a side of the card transport path of the circuit board top surface, the sealant covers an end edge portion located at both sides of the magnetic sensor in the width direction of the card transport path. In this way, when the magnetic sensor unit is mounted in the card reader main body, even if the iron powder or the like in the air enters into a side of the circuit board bottom surface via the through hole for wiring of the plate unit of the sensor holder, it is possible to prevent or suppress a situation where the iron power or the like moves from a side of the circuit board bottom surface to a side of the circuit board top surface and adheres to the magnetic sensor.

In at least an embodiment of the present invention, the card reader main body includes, as the locked unit, a pair of the locked units at both sides between which the bottom plate unit is interposed in a width direction of the card transport path, and the sensor holder includes, as the locking unit, a pair of the locking units locked into the pair of locked units at both sides between which the fixation unit is interposed in the width direction of the card transport path. In this way, when the magnetic sensor unit is mounted in the mount unit, it is easy to define a position and a posture of the magnetic sensor on the card transport path.

In at least an embodiment of the present invention, the mount unit includes an end plate unit configured to oppose the magnetic sensor from a side of the card insertion port while rising at an opposite side of a side at which the card transport path is located from the end edge at a side of the card insertion port in the bottom plate unit, at an end surface at an opposite side of the card transport path of the end plate unit, a stepped unit including an end surface facing an opposite side of the card insertion port is arranged, and the sensor holder includes a protruded plate unit configured to protrude toward a side at which the card insertion port is located from an opposite side of the card transport path of the magnetic sensor to fit into the stepped unit. In this way, when the magnetic sensor unit is mounted in the card reader main body, it is possible to prevent or suppress a situation where an iron powder or the like in the air enters between the mount unit and the magnetic sensor unit from a side of the card insertion port and adheres to the magnetic sensor.

Next, at least an embodiment of the present invention may be a magnetic sensor unit of the card reader mentioned above.

According to at least an embodiment of the present invention, the magnetic sensor unit is mounted on the card reader in a state where the locking unit of the magnetic sensor unit is locked into the locked unit arranged in the mount unit of the card reader. Therefore, it is easy to define a position and a posture of the magnetic sensor unit during mounting. Further, the magnetic sensor is fixed to the fixation unit by an adhesive, and thus, it is easy to hold the magnetic sensor in the sensor holder. Further, the adhesive is applied to an opposite surface that is opposite to the sensor surface, and thus, it is possible to prevent or suppress the adhesive from adhering to the sensor surface.

Further, at least an embodiment of the present invention is characterized by a magnetic sensor unit configured to detect a contact terminal of an IC chip of a card inserted into a card transport path arranged in a card reader which includes a magnetic sensor including a sensor surface facing a side of the card transport path and an opposite surface facing an opposite direction of the sensor surface, a sensor holder including a fixation unit to which the magnetic sensor is fixed and a locking unit, and an adhesive configured to fix the magnetic sensor to the fixation unit, in which the adhesive covers the opposite surface, and the magnetic sensor unit is detachably mounted on the card reader in a state where the locking unit is locked into a locked unit arranged in the card reader.

According to at least an embodiment of the present invention, the magnetic sensor unit is mounted on the card reader in a state where the locking unit of the magnetic sensor unit is locked into the locked unit arranged in the mount unit of the card reader. Therefore, it is easy to define a position and a posture of the magnetic sensor unit during mounting. Further, the magnetic sensor is fixed to the fixation unit by an adhesive, and thus, it is easy to hold the magnetic sensor in the sensor holder. Moreover, the adhesive is applied to an opposite surface opposite to the sensor surface, and thus, it is possible to prevent or suppress a situation where the adhesive for fixing the magnetic sensor adheres to the sensor surface.

According to the card reader of at least an embodiment of the present invention, the magnetic sensor unit configured to detect the contact terminal of the IC chip mounted on the IC card is detachably mounted on a mount unit of the card reader. Therefore, where necessary, the magnetic sensor unit is mounted on or unmounted from the card reader main body to suppress an introduction cost when the card reader is introduced to a shop or the like.

Further, the magnetic sensor unit of at least an embodiment of the present invention is mounted on the card reader in a state where the locking unit is locked into the locked unit arranged in the card reader. Therefore, it is easy to define a position and a posture of the magnetic sensor unit during mounting. Moreover, the magnetic sensor is fixed to the fixation unit by an adhesive, and thus, it is easy to hold the magnetic sensor in the sensor holder. Further, the adhesive is applied to an opposite surface opposite to the sensor surface, and thus, it is possible to prevent or suppress a situation where the adhesive for fixing the magnetic sensor adheres to the sensor surface.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a cross-sectional view of the card insertion unit on which the magnetic sensor unit is mounted.

FIG. 5A to FIG. 5E are a plan view, a cross-sectional view along a width direction, a bottom view, a cross-sectional view along a transport direction, and a rear view of the magnetic sensor unit.

DETAILED DESCRIPTION

Below, at least an embodiment of a card reader and a magnetic sensor unit to which the present invention is applied will be described with reference to the drawings.
(Card Reader)

Figure 1:
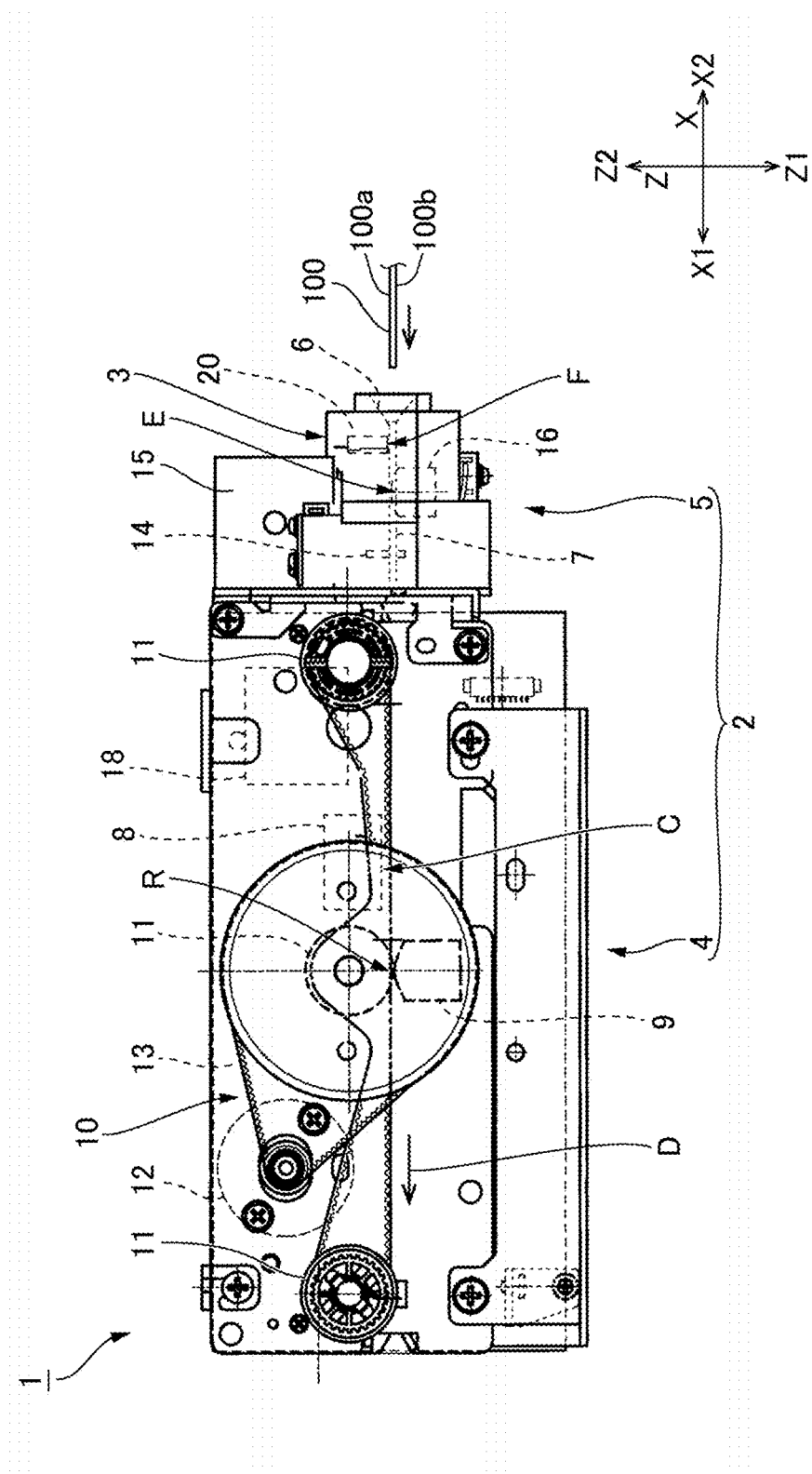
FIG. 1 is an explanatory view of a card reader to which at least an embodiment of the present invention is applied, seen from the side.
Figure 2:
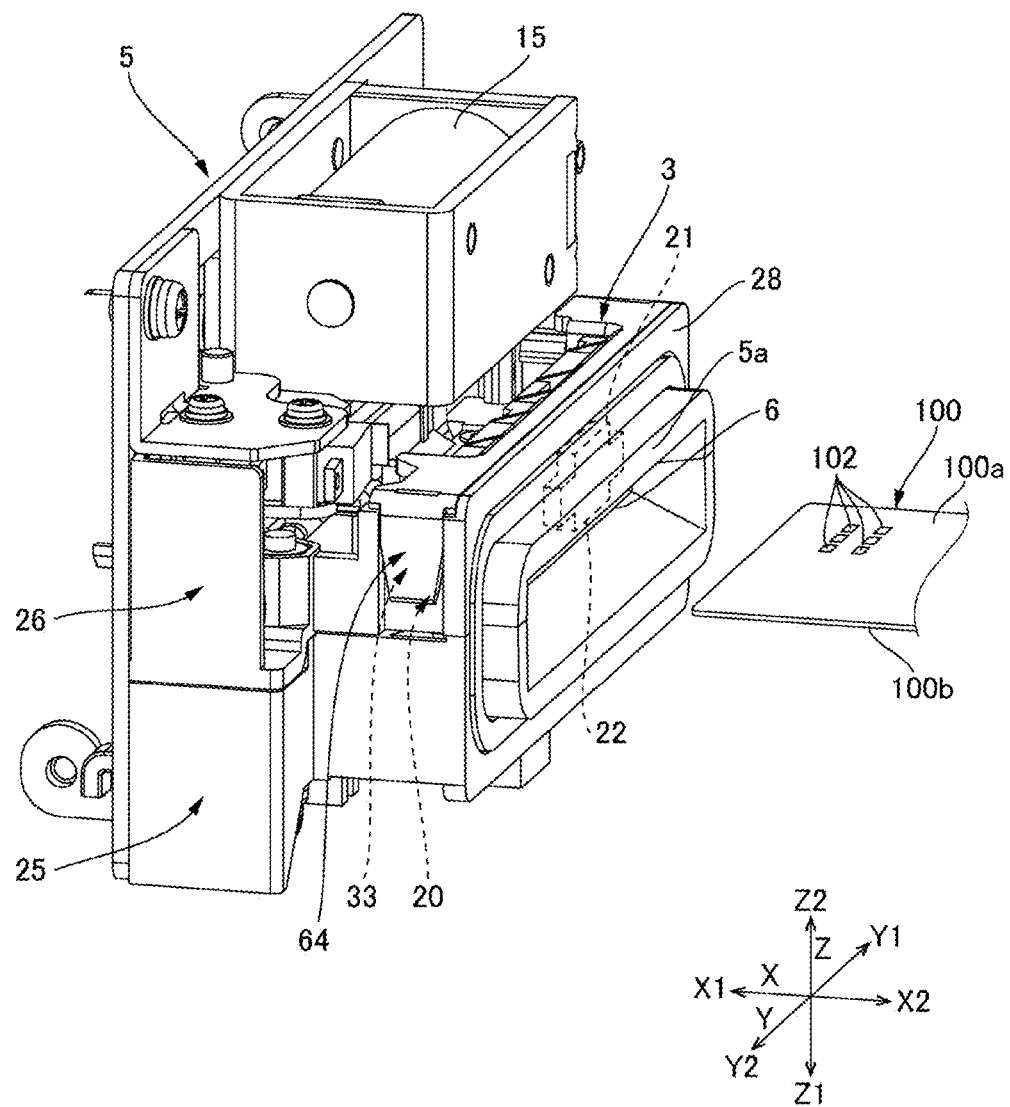
FIG. 2 is a perspective view of a card insertion unit and an IC card on which a magnetic sensor unit is mounted.

FIG. 1 is an explanatory view when a card reader to which at least an embodiment of the present invention is applied is seen from the side. FIG. 2 is a perspective view of a card insertion unit of a card reader main body on which a magnetic sensor unit is mounted, and an IC card. A card reader 1 is configured to perform a process on an IC card 100 on which an IC chip is mounted, and on a magnetic card (not illustrated) including a magnetic stripe. The card reader 1 in use is communicatively connected with a higher-level device. The IC card 100 includes, on a top surface 100*a* thereof, an IC chip (not illustrated), and a contact terminal 102 for communication of the IC chip. In the IC card illustrated in FIG. 2, the contact terminal 102 is arranged in two rows. A magnetic stripe (not illustrated) may be formed on a bottom surface 100*b* of the IC card 100. A magnetic stripe is included on a bottom surface of the magnetic card.

As illustrated in FIG. 1, the card reader 1 includes a card reader main body 2, and a magnetic sensor unit 3 detachably mounted on the card reader main body 2. The card reader main body 2 includes a card processing unit 4, and a card insertion unit 5 provided at a front end of the card processing unit 4. The card reader 1 includes a card transport path 7 extending from a card insertion port 6 at a front surface of the card insertion unit 5 into the card processing unit 4.

The card processing unit 4 includes an IC contact block 8 configured to contact the contact terminal 102 of the IC card 100 to perform data communication. Further, the card processing unit 4 includes a magnetic head 9 configured to perform at least one of reading and writing of magnetic data from or into the magnetic stripe of the IC card 100 and the magnetic card. A contact position C at which an IC contact block 8 contacts the contact terminal 102, and a read/write position R of the magnetic data by the magnetic head 9 are set in the card transport path 7.

Further, the card processing unit 4 includes a card transport mechanism 10 configured to transport the IC card 100 or the like along the card transport path 7. The card transport mechanism 10 includes a plurality of transport rollers 11, a transport motor 12, and a driving force transmission mechanism 13 configured to transmit a rotation of the transport motor 12 to each of the transport rollers 11. The IC card 100 inserted into the card insertion port 6 is transported in a transport direction D from the card insertion unit 5 to the card processing unit 4. In the transport direction D, the contact position C is set upstream of the read/write position R.

In the following description, three directions perpendicular to one another are referred to as an X direction, a Y direction, and a Z direction. The X direction corresponds to the transport direction D. A direction from the card insertion port 6 to the card processing unit 4 in the transport direction D is an X1 direction, and a direction from the card processing unit 4 to the card insertion port 6 in the transport direction D is an X2 direction. It is noted that the X direction is a front-rear direction of the card reader 1, the X1 direction is a rear direction of the card reader 1, and the X2 direction is a front direction of the card reader 1. The Y direction is a width direction of the card transport path 7 perpendicular to the transport direction D. Further, the Y direction is a width direction of the card reader 1. One side in the width direction is a Y1 direction and the other side is a Y2 direction. The Z direction is an up-down direction; the down direction being a Z1 direction and the up direction being a Z2 direction.

The card insertion port 6 is a slit extending in the Y direction. As illustrated in FIG. 2, the card insertion unit 5 includes a bezel unit 5a with an opening height increasing along the X2 direction, around the card insertion port 6.

Further, as illustrated in FIG. 1, the card insertion unit 5 includes a shutter 14 configured to open and close the card transport path 7, a solenoid 15 configured to drive the shutter 14, and a pre-head 16 arranged between the shutter 14 and the card insertion port 6. Further, the card insertion unit 5 includes an insertion detection sensor (not illustrated) configured to detect the insertion of the card into the card insertion port 6. Here, if the card inserted into the card insertion port 6 includes a magnetic stripe, the pre-head 16 detects the magnetic stripe.

Further, the card insertion unit 5 includes a mount unit 20 of the magnetic sensor unit 3 between the pre-head 16 and the card insertion port 6.

Here, the magnetic sensor unit 3 includes a magnetic sensor 21. The magnetic sensor 21 is a sensor for determining whether or not the IC chip is mounted on the card inserted into the card insertion port 6, and detects the contact terminal 102 of the IC card 100. When the magnetic sensor unit 3 is mounted on the mount unit 20, the magnetic sensor 21 is arranged between the card insertion port 6 and the pre-head 16.

In the card transport path 7, a detection position E of the magnetic stripe by the pre-head 16 is set in the X2 direction (upstream of the transport direction D) relative to the read/write position R at which the magnetic head 9 performs reading/writing for the magnetic stripe. On the card transport path 7, a detection position F of the contact terminal 102 by the magnetic sensor 21 is set in the X2 direction (upstream of the transport direction D) relative to the contact position C at which the IC contact block 8 contacts the contact terminal 102. Further, the detection position F of the contact terminal 102 by the magnetic sensor 21 is set in the X2 direction (upstream of the transport direction D) relative to the detection position F of the magnetic stripe by the pre-head 16.

The pre-head 16 is located in the Z1 direction (lower side) of the card transport path 7. The magnetic sensor 21 is positioned in the Z2 direction (upper side) of the card transport path 7. Therefore, the magnetic sensor 21 is arranged at an opposite side of the pre-head 16 with the card transport path 7 being interposed therebetween. In this arrangement, it is assumed that in the IC card 100, the contact terminal 102 of the IC chip is arranged on the top surface 100a of the card and the magnetic stripe is arranged on the bottom surface 100b of the IC card 100. Further, the magnetic sensor 21 is arranged at a location slightly near the Y1 direction away from a center of the width direction of the card transport path 7, if the card insertion unit 5 is seen from a side of the card insertion port 6. This location is a location at which a sensor surface 22 of the magnetic sensor 21 opposes the contact terminal 102, if the IC card 100 is inserted in a correct posture into the card transport path 7. The correct insertion posture of the IC card 100 is a posture in which, as illustrated in FIG. 2, the top surface 100a on which the contact terminal 102 is arranged faces the Z2 direction, and the contact terminal 102 is located in the X1 direction (downstream of the transport direction D) in the IC card 100.

The card reader 1 includes a controller 18. Output signals of various sensors including the magnetic sensor 21 and the pre-head 16 are input into the controller 18. The controller 18 controls each unit of the card reader 1, based on the output signals of the sensors.

(Operation of Card Reader)

In a state before the card is inserted into the card insertion unit 5, the shutter 14 is in a state of closing the card transport path 7. If detecting insertion of a card-like object into the card transport path 7 based on the output signal from the insertion detection sensor, the controller 18 of the card reader 1 determines the presence or absence of the contact terminal 102, based on the output signal from the magnetic sensor 21. Further, the controller 18 determines the presence or absence of the magnetic stripe, based on the output signal from the pre-head 16.

If the contact terminal 102 is detected by the magnetic sensor 21, the controller 18 determines that the IC card 100 is inserted, with the correct posture, into the card insertion port 6, and drives the solenoid 15 to open the shutter 14. Further, the controller 18 drives the transport motor 12 to transport the IC card 100 by the card transport mechanism 10 into the X1 direction (transport direction D) along the card transport path 7. Further, at the contact position C, the controller 18 brings the IC contact block 8 into contact with the contact terminal 102 of the IC card 100 to perform data communication with the IC chip. Moreover, if the magnetic stripe is detected by the pre-head 16, the controller 18 reads or writes the magnetic data, by the magnetic head 9, from or into the magnetic stripe of the IC card 100 passing through the read/write position R.

Further, if the contact terminal 102 is not detected by the magnetic sensor 21, but the magnetic stripe is detected by the pre-head 16, the controller 18 determines that the magnetic card is inserted into the card insertion port 6 and drives the solenoid 15 to open the shutter 14. Further, the controller 18 drives the transport motor 12 to transport the magnetic card by the card transport mechanism 10 in the X1 direction (transport direction D) along the card transport path 7. Further, the controller 18 reads or writes the magnetic data, by the magnetic head 9, from or into the magnetic stripe of the magnetic card passing through the read/write position R.

(Mount Unit)

Figure 4:
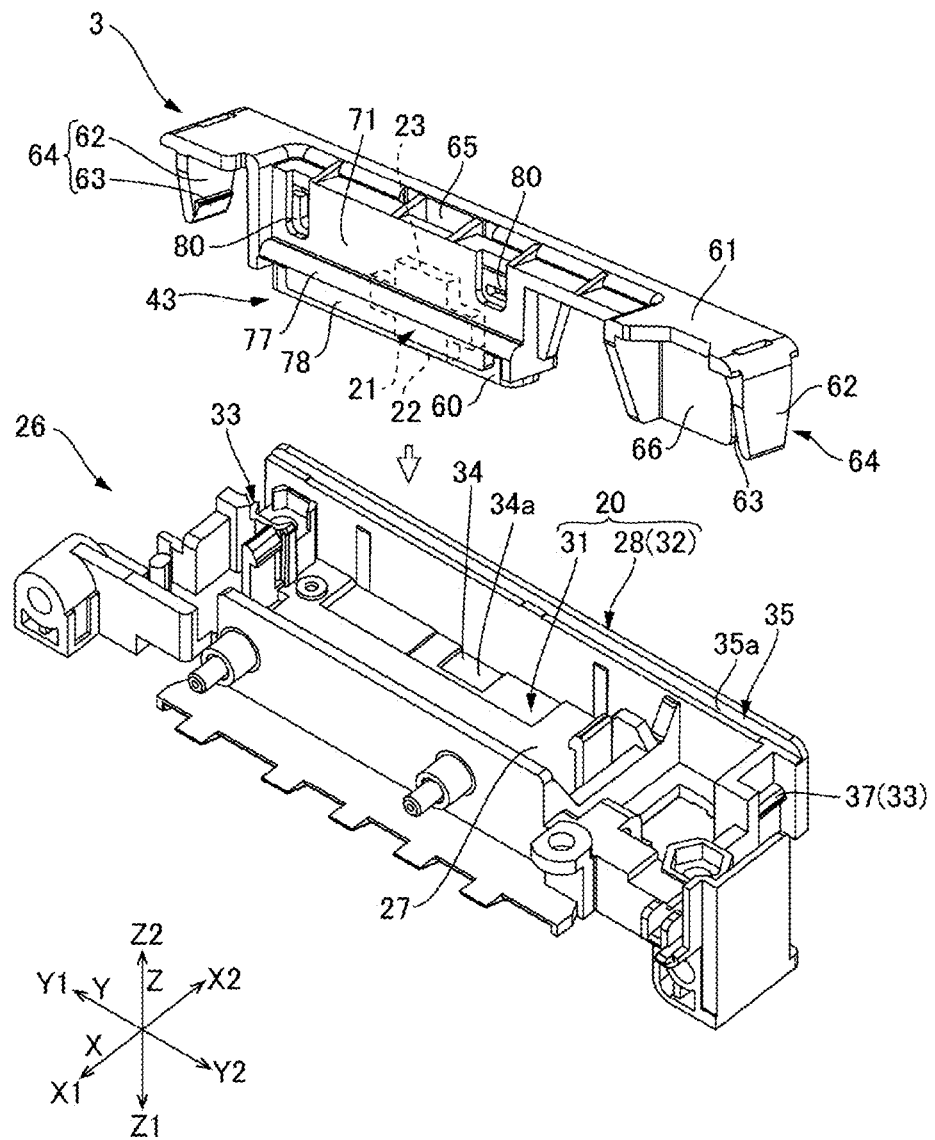
FIG. 4 is an exploded perspective view of an upper member of the card insertion unit and the magnetic sensor unit.

FIG. 3 is a cross-sectional view of the card insertion unit 5 on which the magnetic sensor unit 3 is mounted. FIG. 4 is an exploded perspective view of an upper member configuring the card insertion unit 5 and the magnetic sensor unit 3. As illustrated in FIG. 3, the card insertion unit 5 includes a lower member 25 including a transport surface of the card transport path 7 and an upper member 26 covering the lower member 25 from the Z2 direction and configuring, together with the lower member 25, the card transport path 7. The pre-head 16 is mounted in the lower member 25. The solenoid 15 is mounted in the upper member 26. Further, the upper member 26 includes the mount unit 20 in the X2 direction of the solenoid 15.

As illustrated in FIG. 4, the upper member 26 includes a ceiling plate unit 27 of which the surface at a side of the Z1 direction acts as a ceiling of the card transport path 7. Further, the upper member 26 includes a front plate unit 28 rising in the Z2 direction from an end edge of the X2 direction of the ceiling plate unit 27. An upper portion above the card transport path 7 of the bezel unit 5a is arranged on a surface (front surface) at a side of the X2 direction of the front plate unit 28.

The mount unit 20 includes a bottom plate unit 31 and an end plate unit 32 rising in the Z2 direction from an end edge of the bottom plate unit 31 in the X2 direction. The bottom plate unit 31 is a front end portion of the ceiling plate unit 27, and is a substantially rectangular region extending in the Y direction along the end edge of the X1 direction of the front plate unit 28. The end plate unit 32 is a front plate unit 28. When the magnetic sensor unit 3 is mounted in the mount unit 20, the bottom plate unit 31 is located between the magnetic sensor unit 3 and the card transport path 7. Further, the mount unit 20 includes a pair of locked units 33 on both sides of the Y direction of the bottom plate unit 31.

A concave unit 34 is arranged in the bottom plate unit 31, at a position slightly offset in the Y1 direction from the center portion of the Y direction. A stepped unit 35 including an end surface 35a facing to the X1 direction is arranged at an upper surface (an end surface of the Z2 direction) of the end plate unit 32. The locked unit 33 includes a protruding unit 37 protruding toward the opposite direction of the bottom plate unit 31.

(Magnetic Sensor Unit)

Figure 6A:
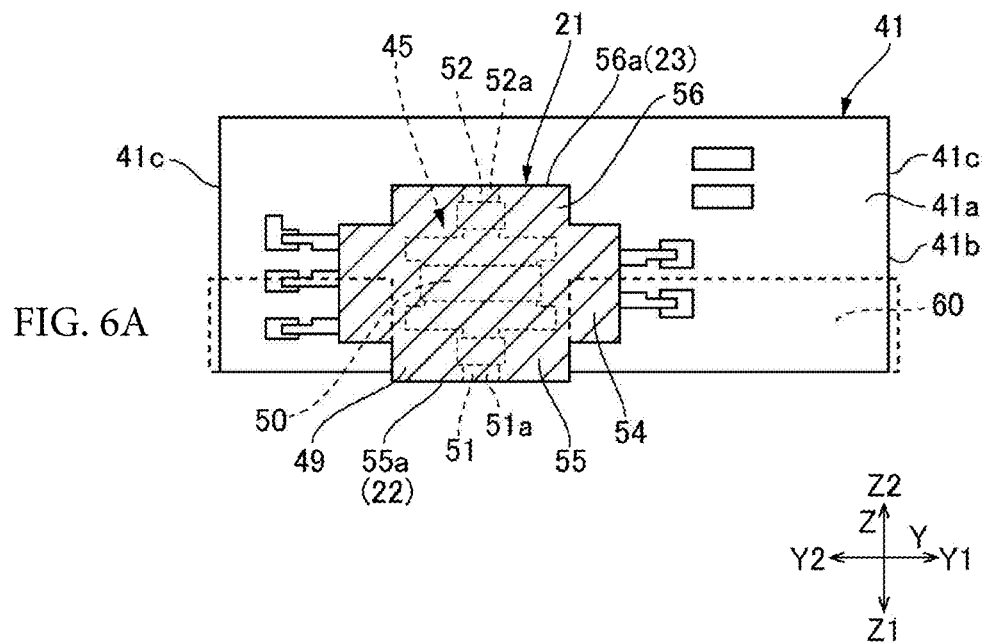
FIG. 6A and FIG. 6B are explanatory views of the magnetic sensor and a circuit board.
Figure 6B:
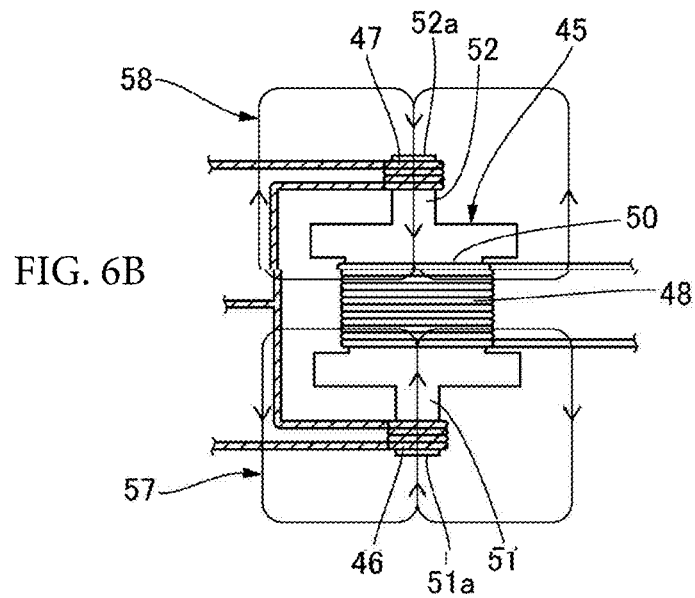
Figure 7A:
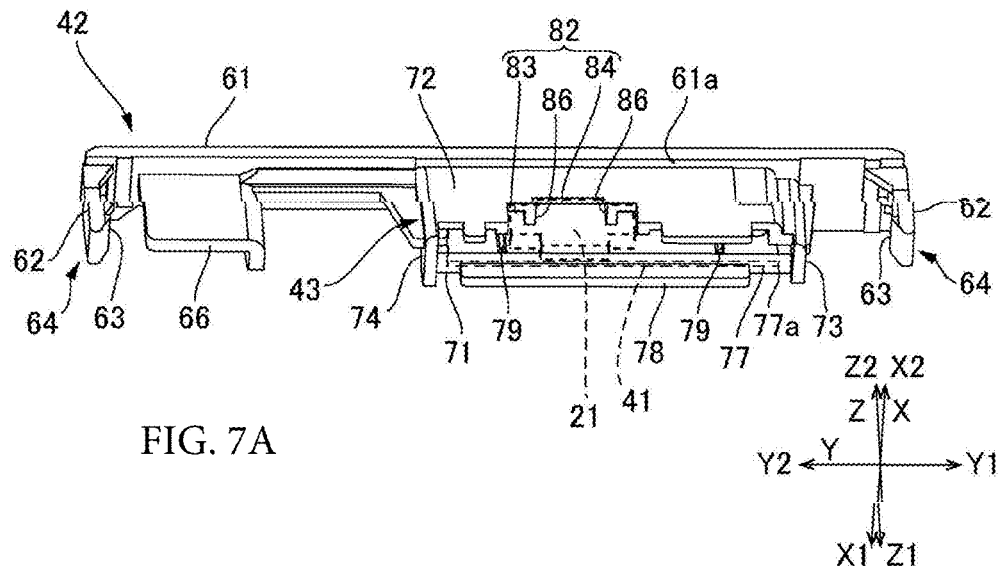
FIG. 7A and FIG. 7B are explanatory views of a sensor holder.
Figure 7B:
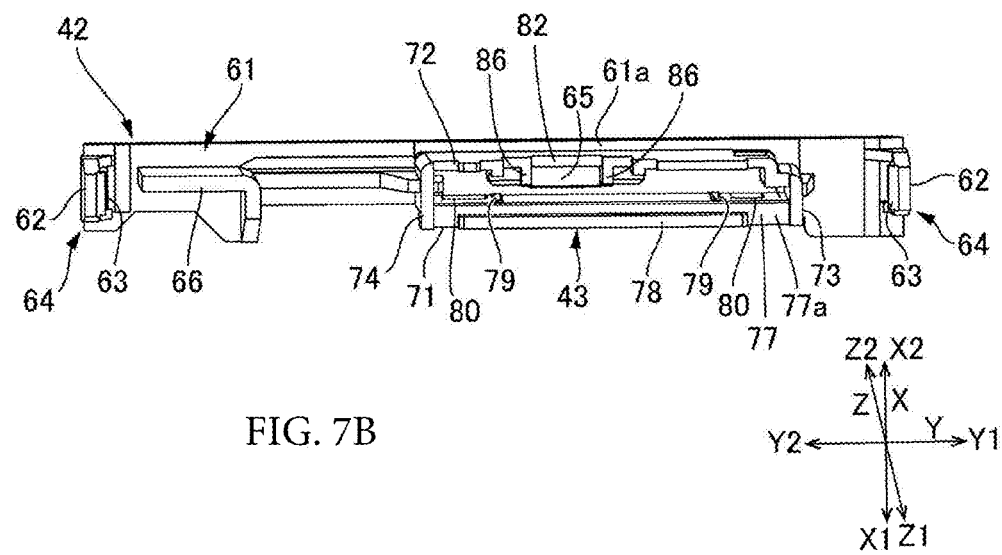

FIG. 5A is a plan view of the magnetic sensor unit 3 seen from the Z2 direction. FIG. 5B is a cross-sectional view of the magnetic sensor unit 3 along an A-A line in FIG. 5A. FIG. 5C is a bottom view of the magnetic sensor unit 3 seen from the Z1 direction. FIG. 5D is a cross-sectional view of the magnetic sensor unit 3 along a B-B line in FIG. 5B. FIG. 5E is a rear view of the magnetic sensor unit 3 seen from the X2 direction. FIG. 6A is a front view of the magnetic sensor 21 and the circuit board seen from the X2 direction. FIG. 6B is an explanatory view of the magnetic sensor 21. FIGS. 7A and 7B are explanatory views of a sensor holder. In FIGS. 7A and 7B, the sensor holder is seen from a side of the X2 direction and from a side of the Z1 direction, respectively. In FIG. 7A, the magnetic sensor 21 and the circuit board fixed to the sensor holder are illustrated by dashed lines.

As illustrated in FIG. 5B, the magnetic sensor unit 3 includes the magnetic sensor 21, a circuit board 41 on which the magnetic sensor 21 is mounted, and a sensor holder 42 configured to hold the magnetic sensor 21 and the circuit board 41. The magnetic sensor 21 is mounted on a side of a circuit board top surface 41a facing into the X2 direction in the circuit board 41. The magnetic sensor 21 and the circuit board 41 are fixed to the sensor holder 42 by an adhesive 88.

(Magnetic Sensor and Circuit Board)

As illustrated in FIGS. 6A and 6B, the magnetic sensor 21 includes a core body 45, a first excitation coil 46, a second excitation coil 47, a detection coil 48, and a housing 49 made of resin and covering the core body 45, the first excitation coil 46, the second excitation coil 47, and the detection coil 48. As illustrated in FIG. 6B, the core body 45 includes a core center unit 50 around which the detection coil 48 is wound, a first core end unit 51 around which the first excitation coil 46 is wound, the first core end unit 51 protruding toward a side of the card transport path 7 from the core center unit 50, a second core end unit 52 around which the second excitation coil 47 is wound, the second core end unit 52 protruding toward a direction opposite to the card transport path 7 from the core center unit 50, a first end surface 51a at an opposite side of the core center unit 50 at the first core end unit 51, and a second end surface 52a at an opposite side of the core center unit 50 at the second core end unit 52. The first excitation coil 46 and the second excitation coil 47 are wound to generate magnetic fields in mutually opposite directions, when excited.

As illustrated in FIG. 6A, the housing 49 has a shape corresponding to the core body 45, if seen from the X2 direction. That is, the housing 49 includes a center portion 54 in which the core center unit 50 is located, a first protruding portion 55 protruding toward the Z1 direction from a center of the Y direction of the center portion 54, and a second protruding portion 56 protruding toward the Z2 direction from the center of the Y direction of the center portion 54. The first core end unit 51 is located inside the first protruding portion 55. The second core end unit 52 is located inside the second protruding portion 56. A tip end surface 55a of the first protruding portion 55 is a surface overlapping with the first end surface 51a of the core body 45 in the housing 49, and is the sensor surface 22 of the magnetic sensor 21. If the first excitation coil 46 is excited, a first magnetic field 57 facing toward the core center unit 50 from the first end surface 51a (the sensor surface 22), is generated. A tip end surface 56a of the second protruding portion 56 is a surface overlapping with the second end surface 52a of the core body 45 in the housing 49, and is an opposite surface 23 facing in an opposite direction of the sensor surface 22. If the second excitation coil 47 is excited, a second magnetic field 58 facing toward the core center unit 50 from the second end surface 52a (the opposite surface 23), is generated.

When the contact terminal 102 of the IC chip is not present at the detection position F opposite to the sensor surface 22, the first magnetic field 57 and the second magnetic field 58 are equal, and thus, there is no output from the detection coil 48 (the output is zero). On the other hand, when the contact terminal 102 is present at the detection position F, a change due to the contact terminal 102 of the IC chip is generated in the first magnetic field 57 of the first excitation coil 46 at a side of the IC card 100 (a side of the card transport path 7). Therefore, an output corresponding to the change of the first magnetic field 57 can be obtained from the detection coil 48. Thus, the contact terminal 102 of the IC chip can be detected, based on the output from the detection coil 48.

Here, as illustrated in FIG. 5C, a belt-shaped sealant 60 is fixed to an end portion of the circuit board 41 in the Z1 direction. The sealant 60 is wound at a lower end portion of the circuit board 41, from a side of a circuit board bottom surface 41b facing in the X1 direction, to a side of a circuit board top surface 41a. The sealant 60 covers a lower end edge of the circuit board bottom surface 41b of the circuit board 41 and covers, at a lower end edge of a pair of board side surfaces 41c located between the circuit board top surface 41a and the circuit board bottom surface 41b at both sides in the Y direction, and at a lower end edge of the circuit board top surface 41a, a lower end edge portion located at both sides of the magnetic sensor 21 in the Y direction. It is noted that, in a state where the magnetic sensor unit 3 is not mounted on the mount unit 20, the sealant 60 protrudes toward the Z1 direction from the circuit board 41.

(Sensor Holder)

The sensor holder 42 is made of resin. As illustrated in FIGS. 5 and 7, the sensor holder 42 includes a ceiling plate unit 61 extending in the Y direction and a pair of side plate units 62 protruding toward each of a Z1 direction from both end portions of the ceiling plate unit 61 in the Y direction. A protruding unit 63 protruding in the Y direction toward a side of the ceiling plate unit 61 is arranged at an end portion of the pair of side plate units 62 in the Z1 direction. The side plate unit 62 and the protruding unit 63 constitute a locking unit 64 to be locked into the pair of locked units 33 arranged in the mount unit 20 of the (card insertion unit 5 of the) card reader main body 2. As illustrated in FIGS. 5A and 5B, a rectangular through hole 65 piercing the ceiling plate unit 61 in the Z direction is arranged at a position slightly offset in the Y1 direction from a center of the Y direction of the ceiling plate unit 61.

Further, the sensor holder 42 includes a fixation unit 43 of the magnetic sensor 21 and the circuit board 41 between a pair of locking units 64 in the Y direction. The fixation unit 43 is arranged at a lower side of the through hole 65 in the ceiling plate unit 61. Therefore, the fixation unit 43 is located at a position slightly offset in the Y1 direction from the center of the Y direction of the ceiling plate unit 61. Further, the sensor holder 42 includes a protruded plate unit 66 at a side of the fixation unit 43 in the Y2 direction.

As illustrated in FIGS. 7A and 7B, the fixation unit 43 includes two plate units (a back plate unit 71 and a front plate unit 72) protruding toward the Z1 direction from the ceiling plate unit 61 and extending parallel in the Y direction. The two plate units (the back plate unit 71 and the front plate unit 72) are arranged on both sides in the X direction with the through hole 65 interposed therebetween. Further, the fixation unit 43 includes two side plate units 73 and 74 protruding toward the Z1 direction from the ceiling plate unit 61 and connecting to each of both end portions of the two plate units (the back plate unit 71 and the front plate unit 72) in the Y direction. Here, the ceiling plate unit 61 includes a protruding plate portion 61a (protruded plate unit) protruding more toward the X2 direction than the front plate unit 72 located in the X2 direction (front direction) among the two plate units (the back plate unit 71 and the front plate unit 72).

As illustrated in FIG. 5E, among the two plate units 71 and 72, the back plate unit 71 located in the X1 direction (rear direction) has a rectangular shape if seen from the X direction. Further, as illustrated in FIGS. 5D and 7B, the back plate unit 71 includes, in an end portion in the Z1 direction, a wide-width unit 77 expanding in the X1 direction. A horizontal rib 78 protruding toward the Z1 direction is arranged at an end edge portion of an end surface 77a of the wide-width unit 77 in the X1 direction. The horizontal rib 78 extends in the Y direction along an end edge of the wide-width unit 77 in the X1 direction. Further, as illustrated in FIG. 7B, the back plate unit 71 includes a pair of vertical back ribs 79 of the back plate unit, the vertical back ribs 79 protruding a side of the front plate unit 72 and extending parallel in the Z direction. The pair of vertical back ribs 79 of the back plate unit are located at both sides in the Y direction, with the through hole 65 interposed therebetween. Further, as illustrated in FIG. 5E, the back plate unit 71 includes a pair of through holes for wiring 80 to perform wiring in the circuit board 41 fixed in the fixation unit 43. The pair of through holes for wiring 80 is formed at both sides in the Y direction, with the pair of vertical back ribs 79 of the back plate unit interposed therebetween.

As illustrated in FIG. 7A, the front plate unit 72 includes a notch unit 82 at an end edge in the Z1 direction. The notch unit 82 has a shape corresponding to an upper portion of the housing 49 of the magnetic sensor 21. That is, the notch unit 82 includes a rectangular lower notch portion 83 corresponding to an upper portion of the center portion 54 of the housing 49 of the magnetic sensor 21, and a rectangular upper notch portion 84 corresponding to the second protruding portion 56 of the housing 49 of the magnetic sensor 21. The upper notch portion 84 extends in the Z2 direction from a center portion of the lower notch portion 83 in the Y direction. Further, as illustrated in FIG. 7B, the front plate unit 72 includes, at an opposite surface opposite to the back plate unit 71, a pair of vertical front ribs 86 extending parallel in the Z direction along an opening edge portion on both sides of the Y direction of the upper notch portion 84 in the front plate unit 72. An end in the Z2 direction of the pair of vertical front ribs 86 continues into an opening edge portion on both sides of the Y direction of the through hole 65 in the ceiling plate unit 61. Here, the pair of vertical front ribs 86 of the front plate unit 72 is located inside the pair of vertical back ribs 79 of the back plate unit 71. The vertical front ribs 86 and the vertical back ribs 79 are separated in the X direction only by a distance corresponding to a thickness of the circuit board 41.

(Fixation of Magnetic Sensor and Circuit Board to Sensor Holder)

As illustrated in FIGS. 7A and 7B, the magnetic sensor 21 is attached to the sensor holder 42 in a state where the circuit board 41 is inserted between the pair of vertical back ribs 79 of the back plate unit 71 and the pair of vertical front ribs 86 of the front plate unit 72, and an upper portion of the magnetic sensor 21 is fitted into the notch unit 82 of the front plate unit 72. Further, the magnetic sensor 21 and the circuit board 41 are fixed to the sensor holder 42 by the adhesive 88 filled between the pair of vertical front ribs 86 of the front plate unit 72 via the through hole 65. Thus, as illustrated in FIG. 3, the adhesive 88 covers the opposite surface 23 of the magnetic sensor 21.

The sealant 60 fixed to the circuit board 41 abuts against the end surface 77a of the wide-width unit 77 of the back plate unit 71 in a state where the magnetic sensor 21 and the circuit board 41 are fixed to the sensor holder 42. Further, as illustrated in FIG. 5E, the sealant 60 covers, together with the back plate unit 71, a whole of the circuit board bottom surface 41b in the state where the magnetic sensor 21 and the circuit board 41 are fixed to the sensor holder 42, seen from the side of the X2 direction. It is noted that, as illustrated in FIG. 5C, the sealant 60 covers a lower end edge of the board side surface 41c of the circuit board 41 in the Y1 direction. The sealant 60 is interposed between the side plate unit 73 connecting the edge portions of the back plate unit 71 and the front plate unit 72 in the Y1 direction, and the board side surfaces 41c. Further, the sealant 60 covers a lower end edge of the board side surface 41c of the circuit board 41 in the Y2 direction. The sealant 60 is interposed between the side plate unit 74 connecting the edge portions of the back plate unit 71 and the front plate unit 72 in the Y2 direction, and the board side surface 41c. Further, the sealant 60 is elastically deformed between the two side plate units 73 and 74 of the fixation unit 43 and the circuit board 41 and seals an interval therebetween.

(Mounting of Magnetic Sensor Unit on Mount Unit)

As illustrated by an arrow in FIG. 4, the magnetic sensor unit 3 is mounted on the mount unit 20 from the side of the Z2 direction. As illustrated in FIG. 2, when the magnetic sensor unit 3 is mounted on the mount unit 20, the pair of locking units 64 arranged on both sides of the sensor holder 42 in the Y direction is locked into the pair of locked units 33 arranged on both sides of the mount unit 20 with the bottom plate unit 31 interposed between the locked units 33.

As illustrated in FIG. 3, in a state where the magnetic sensor unit 3 is mounted on the mount unit 20, the protruding plate portion 61a protruding more toward the X2 direction than the front plate unit 72 of the fixation unit 43 in the ceiling plate unit 61 is fitted into the stepped unit 35 arranged on the upper surface of the end plate unit 32 of the mount unit 20. Further, the sensor surface 22 of the magnetic sensor 21 abuts against a bottom surface 34a of the concave unit 34 arranged in the bottom plate unit 31. Further, the sealant 60 is elastically deformed between the back plate unit 71 of the sensor holder 42 and the bottom plate unit 31 of the mount unit 20 to seal an interval between the back plate unit 71 and the bottom plate unit 31 from the side of the X1 direction.

(Operation and Effect)

According to at least an embodiment of the present invention, the magnetic sensor unit 3 configured to detect the contact terminal 102 of the IC chip mounted on the IC card 100 is detachably mounted on the mount unit 20 of the card reader main body 2. Therefore, if the card reader 1 is used in an application for performing only reading/writing of the magnetic card, the magnetic sensor 21 not needed for the application can be omitted by removing the magnetic sensor unit 3 from the card reader main body 2 and thus, it is possible to suppress the introduction cost when the card reader 1 is introduced to a shop or the like. On the other hand, if processing of the IC card is needed, the card reader 1 can be upgraded to the IC card-compatible card reader 1 by mounting the magnetic sensor unit 3 on the card reader 1 in which the magnetic sensor 21 is omitted. This eliminates a need of newly purchasing the IC card-compatible card reader 1, and thus, it is possible to suppress the introduction cost of the IC card-compatible card reader 1.

Here, the magnetic sensor unit 3 is mounted on the card reader main body 2 in a state where the locking unit 64 of the magnetic sensor unit 3 is locked into the locked unit 33 arranged in the mount unit 20. Therefore, it is easy to define the position and posture of the magnetic sensor unit 3 on the card transport path 7. Further, in the magnetic sensor unit 3, the magnetic sensor 21 is fixed to the fixation unit 43 by the adhesive 88, and thus, it is easy to fix the magnetic sensor 21 to the sensor holder 42. Further, the adhesive 88 is applied to the opposite surface 23 that is opposite to the sensor surface 22 of the magnetic sensor 21, and thus, it is possible to prevent or suppress the adhesive 88 from adhering to the sensor surface 22.

Further, in the magnetic sensor 21 of the present example, due to the magnetic field 58 generated by the second excitation coil 47, an iron sand or the like in the air may be attracted and adhere to the opposite surface 23. If the iron sand or the like in the air adheres to the opposite surface 23, the output from the detection coil 48 varies, and thus, a problem arises that the contact terminal 102 of the IC chip is falsely detected. To solve such a problem, the opposite surface 23 is covered with the adhesive 88 for fixing the magnetic sensor 21 to the fixation unit 43. Therefore, the iron sand or the like does not adhere to the opposite surface 23 of the magnetic sensor 21, and thus, it is possible to prevent a false detection.

Further, the magnetic sensor unit 3 includes the circuit board 41 on which the magnetic sensor 21 is mounted, and the circuit board 41 is fixed to the fixation unit 43 by the adhesive 88. Therefore, the fixation of the circuit board 41 is easy.

Further, in the magnetic sensor unit 3, the sealant 60 attached to the circuit board 41 covers, together with the back plate unit 71 of the sensor holder 42, a whole of the circuit board bottom surface 41b from the side of the X1 direction. Further, when the magnetic sensor unit 3 is mounted on the mount unit 20, the sealant 60 is elastically deformed between the back plate unit 71 and the bottom plate unit 31 of the mount unit 20 to seal the interval between the back plate unit 71 and the bottom plate unit 31. Therefore, when the magnetic sensor unit 3 is mounted on the card reader main body 2, a movement is from the side of the back plate unit 71 of the sensor holder 42 to the side of the circuit board top surface 41a and thus, adhesion to the magnetic sensor 21 can be prevented or suppressed.

Furthermore, in the present example, the back plate unit 71 includes the through hole for wiring 80, however, the sealant 60 covers, at the end edge of the side of the card transport path 7 of the pair of circuit board side surfaces 41c and the end edge of the side of the card transport path 7 of the circuit board top surface 41a in the circuit board 41, the end edge portion located at both sides of the magnetic sensor 21 in the Y direction. Therefore, when the magnetic sensor unit 3 is mounted in the card reader main body 2, even if the iron powder or the like in the air enters into a side of the board bottom surface 41b via the through hole for wiring 80 of the back plate unit 71 of the sensor holder 42, it is possible to prevent or suppress a situation where the iron power or the like moves from a side of the circuit board bottom surface 41b to a side of the circuit board top surface 41a and adheres to the magnetic sensor 21.

Further, in the present example, the card reader main body 2 includes, as the locked unit 33, the pair of locked units 33 at both sides between which the bottom plate unit 31 is interposed in the Y direction, and the sensor holder 42 of the magnetic sensor unit 3 includes, as the locking unit 64, the pair of locking units 64 locked in the pair of locked units 33 at both sides between which the fixation unit 43 of the magnetic sensor 21 is interposed in the Y direction. Therefore, when the magnetic sensor unit 3 is mounted on the mount unit 20, it is easy to define a position and a posture of the magnetic sensor 21 on the card transport path 7.

Further, in the present example, the mount unit 20 includes the stepped unit 35 at an end surface in the Z2 direction of the end plate unit 32 (the front plate unit 28 of the card insertion unit 5) opposite from the side of the X2 direction with respect to the magnetic sensor 21. On the other hand, the ceiling plate unit 61 of the sensor holder 42 includes the protruding plate portion 61*a* protruding toward the X2 direction from a side of the Z2 direction of the fixation unit 43 of the magnetic sensor 21. When the magnetic sensor unit 3 is mounted into the card reader main body 2, the protruding plate portion 61*a* of the sensor holder 42 is fitted into the stepped unit 35 of the mount unit 20. Therefore, when the magnetic sensor unit 3 is mounted in the card reader main body 2, it is possible to prevent or suppress a situation where an iron powder or the like in the air enters between the mount unit 20 and the magnetic sensor unit 3 from the side of the X2 direction (the side of the card insertion port 6) and adheres to the magnetic sensor 21.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card comprising an IC chip comprising a contact terminal, the card reader comprising:
   a card reader main body comprising a card transport path through which the card is transported and a card insertion port configured to insert the card into the card transport path; and
   a magnetic sensor unit configured to detect the contact terminal of the IC chip of the card inserted into the card transport path, wherein
   the card reader main body comprises a mount unit in which the magnetic sensor unit is detachably mounted,
   the mount unit comprises a locked unit,
   the magnetic sensor unit comprises a magnetic sensor comprising a sensor surface facing a side of the card transport path and an opposite surface facing an opposite direction of the sensor surface, a sensor holder comprising a locking unit locked into the locked unit and a fixation unit to which the magnetic sensor is fixed, and an adhesive configured to fix the magnetic sensor to the fixation unit, and
   the adhesive covers the opposite surface.

2. The card reader according to claim 1, wherein the magnetic sensor comprises a core body, a first excitation coil, a second excitation coil, a detection coil, and a housing made of resin, the housing covering the core body, the first exciting coil, the second excitation coil and the detection coil,
   the core body comprises a core center unit around which the detection coil is wound, a first core end unit around which the first excitation coil is wound, the first core end unit protruding toward a side of a card transport path from the core center unit, a second core end unit around which the second excitation coil is wound, the second core end unit protruding toward a direction opposite to the card transport path from the core center unit, a first end surface opposite to the core center unit at the first core end unit, and a second end surface opposite to the core center unit at the second core end unit,
   the first excitation coil and the second excitation coil are wound to generate magnetic fields in mutually opposite directions,
   the sensor surface is a surface overlapping the first end surface in the housing, and
   the opposite surface is a surface overlapping the second end surface in the housing.

3. The card reader according to claim 2, wherein the magnetic sensor unit comprises a circuit board on which the magnetic sensor is mounted, and
   the circuit board is fixed to the fixation unit by the adhesive.

4. The card reader according to claim 3, wherein the mount unit comprises a bottom plate unit located between the magnetic sensor unit and the card transport path,
   the sensor unit comprises a sealant attached to the circuit board,
   the circuit board comprises a circuit board top surface facing a side at which the card insertion port is located, and a circuit board bottom surface facing an opposite side of the card insertion port,
   the magnetic sensor is mounted on the circuit board top surface, and the sensor surface abuts against the bottom plate unit,
   the fixation unit comprises a plate unit opposing the circuit board bottom surface, and
   the sealant is positioned between the plate unit and the bottom plate unit, and together with the plate unit, covers a whole of the circuit board bottom surface from an opposite side of the card insertion port, and is elastically deformed between the plate unit and the bottom plate unit to seal a gap between the plate unit and the bottom plate unit.

5. The card reader according to claim 4, wherein the plate unit comprises a through hole for wiring, and
   in the circuit board, at an end edge at a side of the card transport path of a pair of circuit board side surfaces located at both sides of a width direction of the card transport path and an end edge at a side of the card transport path of the circuit board top surface, the sealant covers an end edge portion located at both sides of the magnetic sensor in the width direction of the card transport path.

6. The card reader according to claim 5, wherein the card reader main body comprises, as the locked unit, a pair of the locked units at both sides between which the bottom plate unit is interposed in a width direction of the card transport path, and
   the sensor holder comprises, as the locking unit, a pair of the locking units locked into the pair of locked units at both sides between which the fixation unit is interposed in the width direction of the card transport path.

7. The card reader according to claim 6, wherein the mount unit comprises an end plate unit configured to oppose the magnetic sensor from a side of the card insertion port while rising at an opposite side of a side at which the card transport path is located from the end edge at a side of the card insertion port in the bottom plate unit,
   at an end surface at an opposite side of the card transport path of the end plate unit, a stepped unit comprising an end surface facing an opposite side of the card insertion port is arranged, and
   the sensor holder comprises a protruded plate unit configured to protrude toward a side at which the card insertion port is located from an opposite side of the card transport path of the magnetic sensor to fit into the stepped unit.

8. The card reader according to claim 5, wherein the mount unit comprises an end plate unit configured to oppose the magnetic sensor from a side of the card insertion port while rising at an opposite side of a side at which the card transport path is located from the end edge at a side of the card insertion port in the bottom plate unit,
   at an end surface at an opposite side of the card transport path of the end plate unit, a stepped unit comprising an end surface facing an opposite side of the card insertion port is arranged, and
   the sensor holder comprises a protruded plate unit configured to protrude toward a side at which the card insertion port is located from an opposite side of the card transport path of the magnetic sensor to fit into the stepped unit.

9. The card reader according to claim 4, wherein the card reader main body comprises, as the locked unit, a pair of the locked units at both sides between which the bottom plate unit is interposed in a width direction of the card transport path, and
   the sensor holder comprises, as the locking unit, a pair of the locking units locked into the pair of locked units at both sides between which the fixation unit is interposed in the width direction of the card transport path.

10. The card reader according to claim 9, wherein the mount unit comprises an end plate unit configured to oppose the magnetic sensor from a side of the card insertion port while rising at an opposite side of a side at which the card transport path is located from the end edge at a side of the card insertion port in the bottom plate unit,
   at an end surface at an opposite side of the card transport path of the end plate unit, a stepped unit comprising an end surface facing an opposite side of the card insertion port is arranged, and
   the sensor holder comprises a protruded plate unit configured to protrude toward a side at which the card insertion port is located from an opposite side of the card transport path of the magnetic sensor to fit into the stepped unit.

11. The card reader according to claim 4, wherein the mount unit comprises an end plate unit configured to oppose the magnetic sensor from a side of the card insertion port while rising at an opposite side of a side at which the card transport path is located from the end edge at a side of the card insertion port in the bottom plate unit,
   at an end surface at an opposite side of the card transport path of the end plate unit, a stepped unit comprising an end surface facing an opposite side of the card insertion port is arranged, and
   the sensor holder comprises a protruded plate unit configured to protrude toward a side at which the card insertion port is located from an opposite side of the card transport path of the magnetic sensor to fit into the stepped unit.

12. The card reader according to claim 1, wherein the magnetic sensor unit comprises a circuit board on which the magnetic sensor is mounted, and
   the circuit board is fixed to the fixation unit by the adhesive.

13. The card reader according to claim 12, wherein the mount unit comprises a bottom plate unit located between the magnetic sensor unit and the card transport path,
   the sensor unit comprises a sealant attached to the circuit board,
   the circuit board comprises a circuit board top surface facing a side at which the card insertion port is located, and a circuit board bottom surface facing an opposite side of the card insertion port,
   the magnetic sensor is mounted on the circuit board top surface, and the sensor surface abuts against the bottom plate unit,
   the fixation unit comprises a plate unit opposing the circuit board bottom surface, and
   the sealant is positioned between the plate unit and the bottom plate unit, and together with the plate unit, covers a whole of the circuit board bottom surface from an opposite side of the card insertion port, and is elastically deformed between the plate unit and the bottom plate unit to seal a gap between the plate unit and the bottom plate unit.

14. The card reader according to claim 13, wherein the plate unit comprises a through hole for wiring, and
   the circuit board, at an end edge at a side of the card transport path of a pair of circuit board side surfaces located at both sides of a width direction of the card transport path and an end edge at a side of the card transport path of the circuit board top surface, the sealant covers an end edge portion located at both sides of the magnetic sensor in the width direction of the card transport path.

15. The card reader according to claim 14, wherein the card reader main body comprises, as the locked unit, a pair of the locked units at both sides between which the bottom plate unit is interposed in a width direction of the card transport path, and
   the sensor holder comprises, as the locking unit, a pair of the locking units locked into the pair of locked units at both sides between which the fixation unit is interposed in the width direction of the card transport path.

16. The card reader according to claim 15, wherein the mount unit comprises an end plate unit configured to oppose the magnetic sensor from a side of the card insertion port while rising at an opposite side of a side at which the card transport path is located from the end edge at a side of the card insertion port in the bottom plate unit,
   at an end surface at an opposite side of the card transport path of the end plate unit, a stepped unit comprising an end surface facing an opposite side of the card insertion port is arranged, and
   the sensor holder comprises a protruded plate unit configured to protrude toward a side at which the card insertion port is located from an opposite side of the card transport path of the magnetic sensor to fit into the stepped unit.

17. The card reader according to claim 14, wherein the mount unit comprises an end plate unit configured to oppose the magnetic sensor from a side of the card insertion port while rising at an opposite side of a side at which the card transport path is located from the end edge at a side of the card insertion port in the bottom plate unit,
   at an end surface at an opposite side of the card transport path of the end plate unit, a stepped unit comprising an end surface facing an opposite side of the card insertion port is arranged, and
   the sensor holder comprises a protruded plate unit configured to protrude toward a side at which the card insertion port is located from an opposite side of the card transport path of the magnetic sensor to fit into the stepped unit.

18. The card reader according to claim 13, wherein the card reader main body comprises, as the locked unit, a pair of the locked units at both sides between which the bottom plate unit is interposed in a width direction of the card transport path, and the sensor holder comprises, as the locking unit, a pair of the locking units locked into the pair of locked units at both sides between which the fixation unit is interposed in the width direction of the card transport path.

19. The card reader according to claim 18, wherein the mount unit comprises an end plate unit configured to oppose the magnetic sensor from a side of the card insertion port while rising at an opposite side of a side at which the card transport path is located from the end edge at a side of the card insertion port in the bottom plate unit, at an end surface at an opposite side of the card transport path of the end plate unit, a stepped unit comprising an end surface facing an opposite side of the card insertion port is arranged, and the sensor holder comprises a protruded plate unit configured to protrude toward a side at which the card insertion port is located from an opposite side of the card transport path of the magnetic sensor to fit into the stepped unit.

20. The card reader according to claim 13, wherein the mount unit comprises an end plate unit configured to oppose the magnetic sensor from a side of the card insertion port while rising at an opposite side of a side at which the card transport path is located from the end edge at a side of the card insertion port in the bottom plate unit, at an end surface at an opposite side of the card transport path of the end plate unit, a stepped unit comprising an end surface facing an opposite side of the card insertion port is arranged, and the sensor holder comprises a protruded plate unit configured to protrude toward a side at which the card insertion port is located from an opposite side of the card transport path of the magnetic sensor to fit into the stepped unit.

* * * * *